US009616416B2

(12) United States Patent
Van Donk et al.

(10) Patent No.: US 9,616,416 B2
(45) Date of Patent: Apr. 11, 2017

(54) PROCESS FOR PREPARING AN INDUSTRIAL HYDROCONVERSION CATALYST, CATALYST THUS OBTAINED AND USE THEREOF IN A HYDROCONVERSION PROCESS (75) Inventors: Sander Van Donk, Sainte-Adresse (FR); Nadiya Danilina, Uccle (BE); Delphine Minoux, Nivelles (BE); Metin Bulut, Heusden-Zolder (BE)

(73) Assignee: TOTAL RAFFINAGE FRANCE, Courbevoie (FR)

( * ) Notice: Subject to any disclaimer, the term of this patent is extended or adjusted under 35 U.S.C. 154(b) by 263 days.

(21) Appl. No.: 13/879,733

(22) PCT Filed: Jun. 10, 2011

(86) PCT No.: PCT/EP2011/059659
§ 371 (c)(1),
(2), (4) Date: Jul. 11, 2013

(87) PCT Pub. No.: WO2012/084276
PCT Pub. Date: Jun. 28, 2012

(65) Prior Publication Data
US 2013/0292301 A1    Nov. 7, 2013

(30) Foreign Application Priority Data
Dec. 23, 2010   (FR) ...................... 10 61170

(51) Int. Cl.
*B01J 29/16*   (2006.01)
*B01J 29/14*   (2006.01)
(Continued)

(52) U.S. Cl.
CPC .......... *B01J 29/166* (2013.01); *B01J 29/146* (2013.01); *B01J 35/002* (2013.01); *B01J 35/109* (2013.01);
(Continued)

(58) Field of Classification Search
CPC ... B01J 29/00; B01J 29/04; B01J 29/06; B01J 29/061; B01J 29/064; B01J 29/08; B01J 29/084
See application file for complete search history.

(56) References Cited

U.S. PATENT DOCUMENTS 3,293,192 A   12/1966 Maher et al.
3,506,400 A    4/1970 Eberly, Jr. et al.
(Continued)

FOREIGN PATENT DOCUMENTS

EP   0 082 211 A1   12/1981
EP   0 247 678 A2   12/1987
(Continued)

OTHER PUBLICATIONS

Satterfield, C.N. (1980). Heterogenous Catalysis in Practice, McGraw-Hill, 416 pgs (Office action cites p. 75).*
(Continued)

*Primary Examiner* — Brian McCaig
(74) *Attorney, Agent, or Firm* — Sughrue Mion, PLLC (57) ABSTRACT The invention relates to a process for preparing a hydroconversion catalyst based on modified zeolite Y, comprising the steps of:
A—preparation of a modified zeolite Y, whose intracrystalline structure presents at least one network of micropores, at least one network of small mesopores with a mean diameter of 2 to 5 nm and at least one network of large mesopores with a mean diameter of 10 to 50 nm, these various networks being interconnected;
B—mixing the zeolite with a binder, shaping the mixture and then calcining;
C—introducing at least one catalytic metal chosen from metals of group VIII and/or of group VIB, followed by calcination.

(Continued)

The invention also relates to a catalyst obtained via this process and also to the use thereof.

20 Claims, 5 Drawing Sheets (51) Int. Cl.
| | |
|---|---|
| B01J 35/00 | (2006.01) |
| B01J 35/10 | (2006.01) |
| B01J 37/00 | (2006.01) |
| B01J 37/02 | (2006.01) |
| C01B 39/02 | (2006.01) |
| C10G 45/04 | (2006.01) |
| C10G 47/16 | (2006.01) |
| C10G 49/08 | (2006.01) |
| C01B 39/20 | (2006.01) |
| C01B 39/24 | (2006.01) |
| B01J 29/00 | (2006.01) |
| B01J 29/04 | (2006.01) |
| B01J 29/06 | (2006.01) |
| B01J 29/064 | (2006.01) |

(52) U.S. Cl.
CPC ....... *B01J 35/1019* (2013.01); *B01J 35/1038* (2013.01); *B01J 35/1061* (2013.01); *B01J 37/0009* (2013.01); *B01J 37/0201* (2013.01); *C01B 39/026* (2013.01); *C01B 39/20* (2013.01); *C01B 39/24* (2013.01); *C10G 45/04* (2013.01); *C10G 47/16* (2013.01); *C10G 49/08* (2013.01); *B01J 37/0203* (2013.01); *B01J 2229/16* (2013.01); *B01J 2229/42* (2013.01)

(56) References Cited

U.S. PATENT DOCUMENTS

| | | | |
|---|---|---|---|
| 4,093,560 A | 6/1978 | Kerr et al. | |
| 4,668,649 A | 5/1987 | Yoshida et al. | |
| 4,857,171 A | 8/1989 | Hoek et al. | |
| 4,925,820 A | 5/1990 | Hoek et al. | |
| 5,069,890 A | 12/1991 | Dai et al. | |
| 5,601,798 A | 2/1997 | Cooper et al. | |
| 2011/0108459 A1 | 5/2011 | Simon et al. | |
| 2012/0018349 A1 | 1/2012 | Van et al. | |

FOREIGN PATENT DOCUMENTS

| | | | |
|---|---|---|---|
| EP | 0 519 573 A1 | 6/1992 | |
| EP | 0 528 494 A1 | 12/1992 | |
| EP | 2 319 902 A1 | 5/2011 | |
| FR | 2940265 A1 * | 6/2010 | ............ C01B 39/24 |
| WO | 2010/072976 A1 | 7/2010 | |

OTHER PUBLICATIONS

Jong et al., Zeolite Y Crystals with Trimodal Porosity as Ideal Hydrocracking Catalysts (2010), Angew. Chem. Int. Ed., 49, pp. 10074-10078, internet publication date Dec. 15, 2010 : http://onlinelibrary.wiley.com/doi/10.1002/ange.201004360/abstract.
Susana Lopes Silva, "Study of hydrocracking catalysts based on modified USY zeolites", Dissertation, Instituto Superior Tecnico, Universidade Tecnica De Lisboa Sep. 1, 2009, pp. 1-34, Retrieved from the Internet: URL:https://dspace.ist.utl.pt/bitstream/2295/350559/1/dissertacao.pdf.
International Search Report of PCT/EP2011/059659 dated Aug. 23, 2012.
S. Van Dork et al., Generation, Characterization, and Impact of Mesopores in Zeolite Catalysts, Catalyst Reviews 45 (2003), pp. 297-319.
A.H.Janssen et al., Three-Dimensional Transmission Electron Microscopic Observations of Mesopores in Dealuminated Zeolite Y, Angew. Chem. Int. Ed. 40 (2001), pp. 1102-1104.
M. Ogura et al., Formation of Uniform Mesopores in ZSM-5 Zeolite through Treatment in Alkaline Solution, Chem. Lett. (2000), pp. 882-883.
M. Ogura, Alkali-treatment technique—new method for modification of structural and acid-catalytic properties of ZSM-5 zeolites, Catal. A. Gen. 219 (2001), pp. 33-43.
J.C. Groen et al., On the introduction of intracrystalline mesoporosity in zeolites upon desilication in alkaline medium, Microporouos Mesoporous Mater. 69 (2004), pp. 29-34.
J.C. Groen, et al., Optimal Aluminum-Assisted Mesoporosity Development in MFI Zeolites by Desilication, J. Phys. Chem. B, 108 (2004), pp. 13062-13065.

* cited by examiner

PROCESS FOR PREPARING AN INDUSTRIAL HYDROCONVERSION CATALYST, CATALYST THUS OBTAINED AND USE THEREOF IN A HYDROCONVERSION PROCESS

CROSS REFERENCE TO RELATED APPLICATIONS

This is a National Stage of International Application No. PCT/EP2011/059659 filed Jun. 10, 2011, claiming priority based on French Patent Application No. 10 61170 filed Dec. 23, 2010, the contents of all of which are incorporated herein by reference in their entirety.

The invention relates to a process for preparing an industrial hydro-conversion catalyst, for example, a hydrocracking catalyst, to the catalyst thus obtained and to the use of the catalyst thus obtained in a hydroconversion process.

The industrial catalyst described here comprises a modified zeolite Y and may be used in many hydroconversion processes, in particular, in the hydrocracking process.

PRIOR ART

The various zeolites are distinguished by different structures and properties. A few structures commonly used in the field of catalysis are described below.

Zeolite Y (FAU) is a three-dimensional zeolite with large pores; its structure has large cavities interconnected by channels formed from 12-membered rings (there are 12 ($Si^{4+}$ and $Al^{3+}$) cations and 12 $O^{2-}$ anions present in the ring).

Beta zeolite (BEA) is a three-dimensional zeolite with large pores comprising pores formed by 12-membered rings in all directions.

Zeolite ZMS-5 (MFI) is a virtually three-dimensional zeolite with medium-sized pores, comprising pores formed by 10-membered rings in one direction that are interconnected by zig-zag channels formed by 10-membered rings.

Mordenite (MOR) is a zeolite with large pores formed by 12-membered rings, with channels extending in only one direction and having small pockets formed by 8-membered rings.

Ferrierite (FER) is a two-dimensional zeolite with medium-sized pores comprising main channels formed by 10-membered rings, which are interconnected via side channels formed by 8-membered rings.

Zeolites are important catalytic materials and largely used in acid catalyzed reactions like cracking (e.g. hydrocracking, FCC, olefin cracking), isomerization reactions (e.g. of paraffins and olefins) and more recently methanol conversion technologies (e.g. MTO, MTP, MTG). For all these reactions, the zeolite is the heart of the catalyst, rendering high catalytic activity, high stability, and last but not least high product selectivity, induced by the microporous zeolite structure. Notwithstanding the positive effect of the presence of micropores with respect to shape selectivity, the micropores may also have a negative impact, which is often illustrated by the low rate of access of molecules into the zeolite crystals, or unwanted adsorption effects of reactants and/or products during the catalytic action. These steric constraints decrease the accessibility of the zeolite micropore volume during the catalytic action, and it can be stated that the zeolite crystals are not always being used effectively.

One of the important issues in the development of new zeolite catalysts is the guarantee of sufficient accessibility of the active sites for reactant and/or product molecules, thereby maximizing the effectiveness of the catalyst. The straightforward solution to minimize diffusion limitation would be the reduction of the intracrystalline diffusion pathlength. One possibility is to decrease the zeolite crystal size. Another strategy to obtain materials with sufficient accessibility is the creation of a secondary pore system consisting of mesopores (2-50 nm) inside the microporous zeolite crystals. Traditionally, mesopores are introduced into zeolites and zeolite-like crystals by dealumination, using hydrothermal treatment such as steaming [U.S. Pat. No. 3,293,192, U.S. Pat. No. 3,506,400, and U.S. Pat. No. 5,069,890], and acid leaching techniques [U.S. Pat. No. 3,506,400, U.S. Pat. No. 4,093,560, and U.S. Pat. No. 5,601,798]. Alternatively, chemical treatments with for example EDTA [U.S. Pat. No. 3,506,400 and U.S. Pat. No. 4,093,560] or $(NH_4)_2SiF_6$ [EP0082211] have been proposed as well. A more detailed literature review on the generation of mesopores in zeolites by various methods, was presented by van Donk et al. [S. van Donk et al., Catalysis Reviews 45 (2003) 297].

Despite of the considerable developments over the last years in the domains of the synthesis, characterization, and comprehension of the formation mechanisms of these structured mesoporous materials, their effective application in industry is still highly limited because of their high cost, which is partially related to the high cost of the organic template. Therefore, from a cost perspective, the classical hydrothermal and acid leaching techniques remain highly attractive, which explains why they are largely used today in industry. However, the introduction of mesopores by these ways is not easily controlled and often materials are obtained with a random and non-optimized mesoporosity. In a paper by Janssen et al. [A. H. Janssen et al., Angew. Chem. Int. Ed. 40 (2001) 1102], it was demonstrated using three-dimensional electron microscopy that a large part of the mesopores in a commercially available steamed and acid leached zeolite Y (CBV 780, Zeolyst Int.) were cavities, not optimally connected to the outer surface of the zeolite crystal. Obviously, for catalysis, a system of interconnected cylindrical mesopores is expected to enhance the accessibility for reactants and the diffusion of reaction products much more than mesoporous cavities inside the crystal.

In recent years, as an alternative to the classical hydrorthermal and acid leaching of the as-synthesized zeolite material, another approach for the formation of mesopores has been proposed [M. Ogura et al., Chem. Lett. (2000) 82; M. Ogura, Appl. Catal. A Gen. 219 (2001) 33; J. C. Groen et al., Microporous Mesoporous Mater. 69 (2004) 29; J. C. Groen, et al., J. Phys. Chem. B, 108 (2004) 13062]. This alternative method is based on the careful desilication of the as-synthesized zeolite by a treatment in an alkaline medium. This technique was firstly explored in the late 1980's for studying dissolution phenomena and structural changes in zeolite Y and ZSM-5. Furthermore, two patents were assigned to Shell on the modification of ultra-stable and very ultra-stable Y-zeolites with a Si/Al ratio between 2 and 12.5 at/at [EP0528494] and their application in a hydrogenation process [EP0519573].

Recently, the Applicant has disclosed in the patent application WO 2010/072 976 a modified zeolite Y prepared by careful desilication of a dealuminated faujasite, which had a unique trimodal system of intracrystalline and interconnected pores. This zeolite showed an improved performance in several hydrocracking reactions, being more selective to middle distillates and suppressing overcracking. Hydrocracking reactions are gaining on importance with the need to treat heavier and more polluted feedstocks and with an increasing demand for middle distillates in Europe. Therefore, a middle distillates-selective hydrocracking catalyst is sought.

However, it is not always possible to use catalytic compositions in powder form industrially, and shaping of the powder is necessary. The document WO 2010/072 976 proposes to apply the novel alkaline treatment process to a composition comprising a modified zeolite Y and a binder in the form of particles ready to be used in a fixed-bed or mobile-bed reactor, especially in extruded form or in the form of beads. A catalytic composition that can be used industrially, in which the modified zeolite Y has a trimodal structure, is thus obtained directly.

DESCRIPTION OF THE INVENTION

The Applicant has now discovered a process for preparing an industrial catalyst comprising modified zeolite Y with good catalytic activity despite degradation of the trimodal structure of the zeolite component.

According to a first aspect, a subject of the invention is a process for preparation of a hydrocracking catalyst based on modified zeolite Y, comprising the steps of:

A—preparation of a modified zeolite Y, whose intracrystalline structure presents at least one network of micropores, at least one network of small mesopores with a mean diameter of 2 to 5 nm and at least one network of large mesopores with a mean diameter of 10 to 50 nm; these various networks being interconnected;

B—mixing the zeolite with a binder, shaping the mixture, and then calcining;

C—impregnation of the zeolite with at least one compound of a catalytic metal chosen from compounds of a metal from group VIIIB and/or from group VIB, followed by calcination.

Group VIB comprises Cr, Mo and W. Group VIIIB corresponds to groups 8, 9 and 10 of IUPAC periodic table of the elements (version of Jun. 22, 2007) and comprises Fe, Ru, Os, Co, Rh, Ir, Ni, Pd, Pt.

Doping agents such as B, P, Si, Zr and Ti can be also added.

The invention also relates to the catalyst that may be obtained via the process described above, namely, a hydroconversion catalyst consisting of a shaped mixture comprising:

a modified zeolite Y, whose intra-crystalline structure presents at least one network of micropores, at least one network of small mesopores with a mean diameter of 2 to 5 nm and at least one network of large mesopores with a mean diameter of 10 to 50 nm, these various networks being interconnected;

at least one binder;

at least one catalytic metal chosen from metals of group VIIIB and/or of group VIB.

This shaped catalyst is ready to be used industrially in a reactor.

The term "shaped" refers to a catalyst that is no longer in powder form, but may be in the form of beads, pellets or extrudates, extrudates being preferred.

This catalyst generally has the following characteristics:
crystallinity of 3% to 80%, preferably from 3% to 20%, for example from 3% to 10%,
specific surface area (BET) from 150 to 550 m$^2$/g, for example from 150 to 300 m$^2$/g,
external specific surface area: 50-250 m$^2$/g, for example 100-250 m$^2$/g,
total pore volume: from 0.2 to 0.6 ml/g, for example from 0.2 to 0.5 ml/g,
amount of Brønsted acid sites: from 0.1 to 3 mmol NH$_3$/g,
zeolite content: 10% to 90% by weight, preferably 20% to 80% by weight;
optionally, NiO content of 1% to 5% by weight and MoO$_3$ content of 5% to 25% by weight.

Generally, step C) is performed after step B). However, it is also possible to perform step C) before step B), on the zeolite prepared in step A).

Step A)

The crystallinity of the zeolite with trimodal porosity may be from 5% to 100%.

Trimodal zeolite may have an Si/Al atomic ratio of less than or equal to 25, especially, less than or equal to 24, or even less than or equal to 23, more particularly, less than or equal to 22, even more particularly, less than or equal to 21 and optionally, less than or equal to 20.5.

The Si/Al ratio may also be less than or equal to 40, especially, less than or equal to 35, or even less than or equal to 30, more particularly, less than or equal to 28 and even more particularly, less than or equal to 25.

The Si/Al atomic ratio may be greater than or equal to 6, especially, greater than or equal to 8, or even greater than or equal to 10, more particularly, greater than or equal to 11 and even more particularly, greater than or equal 12.

The Si/Al ratio may also be greater than or equal to 15, especially, greater than or equal to 17, or even greater than or equal to 18, more particularly, greater than or equal to 19 and even more particularly, greater than or equal 20.

The zeolite prepared during step A) advantageously has a ratio of the volume of the small mesopores (Vs) to the volume of the large mesopores Vl, Vs/Vl, of greater than or equal to 1, especially greater than or equal to 1.20, or even greater than or equal to 1.60, more particularly, greater than or equal 1.80 and even more particularly, greater than or equal to 2.

The zeolite prepared during step A) has a total mesopore volume of greater than or equal to 0.20 ml/g, especially greater than or equal to 0.25 ml/g, in particular, greater than or equal to 0.35 ml/g, or even greater than or equal to 0.40 ml/g.

The zeolite prepared during step A) has a micropore volume of less than or equal to 0.20 ml/g, especially, less than or equal to 0.18 ml/g, in particular, less than or equal to 0.16 ml/g, or even less than or equal to 0.125 ml/g and more particularly, less than or equal to 0.10 ml/g.

The zeolite prepared during step A) has a total mesopore volume/micro-pore volume ratio of greater than or equal to 1, especially, greater than or equal to 1.5, in particular, greater than or equal to 3, or even greater than or equal to 3.5, more particularly, greater than or equal to 4, even more particularly, greater than or equal to 4.5 or even greater than or equal to 5.

The modified zeolite Y prepared during step A) may have an external surface area S$_{ext}$ of greater than or equal to 200 m$^2$/g, especially, greater than or equal to 250 m$^2$/g, in particular, greater than or equal to 300 m$^2$/g, or even greater than or equal to 350 m$^2$/g and more particularly, greater than or equal to 400 m$^2$/g.

The acid site density, measured by TPD of ammonia (TPD NH$_3$), may be less than or equal to 0.25 mmol/g, especially, less than or equal to 0.23 mmol/g, in particular, less than or equal to 0.22 mmol/g or even less than or equal to 0.21 mmol/g.

The modified zeolite Y prepared during step A) generally has the characteristic reflections of a faujasite structure on an X-ray diffraction pattern. These reflections correspond to the following interplane distances: d=13.965, 8.552, 7.293, 5.549, 4.655, 4.276, 3.824, 3.689, 3.232, 2.851, 2.793 and 2.578 Å (reference: Collection of simulated XRD powder patterns for zeolites, fifth revised edition, by M. M. J. Treacy and J. B. Higgins, Elsevier).

Step A) of preparation of the trimodal modified zeolite Y may include the following steps:
a) contacting a zeolite Y in a basic aqueous solution comprising at least one base, for example, NaOH, $NH_4OH$, KOH, sodium carbonate, sodium citrate, at a concentration ranging, for example, from 0.001 to 0.5 M, at room temperature, with magnetic or mechanical stirring,
b) filtering off the zeolite obtained and washing it with a solvent, preferentially, a polar solvent, for example pure distilled water,
c) optionally, drying the washed zeolite,
d) placing in contact under stirring the washed and optionally dried zeolite in a solution, preferentially, an aqueous solution, of $NH_4NO_3$, especially at a concentration ranging from 0.01 to 0.5 M, this step can be performed several times, for example 2 to 3 times,
e) washing the zeolite with distilled water until neutral pH,
f) calcining the obtained zeolite and
g) recovering the zeolite.

The modified zeolite Y used during step a) of the process described above will preferably have an Si/Al ratio of greater than or equal to 12.

Such a zeolite may be obtained, for example, by applying to a zeolite Y at least one dealumination treatment, in particular a partial dealumination treatment for example, with at least one acid and/or water vapour treatment. These treatments may lead to (i) reducing of the acidity of the material, (ii) increase, albeit slightly, in the mesoporosity of the initial material, which is theoretically purely microporous. Most particularly, these treatments correspond to those described in U.S. Pat. No. 5,601,798 (see references), the content of which is incorporated by reference.

In step a), the aqueous solution/zeolite Y weight ratio may range from 20 to 100, especially from 30 to 80, in particular from 40 to 60, or may even be about 50.

The base concentration of the solution of step a) may range from 0.001 to 0.5 M, especially from 0.005 to 0.2, in particular from 0.01 to 0.1, or may even be about 0.05 M.

In step d), the $NH_4NO_3$ solution/zeolite Y weight ratio may range from 5 to 75, especially from 10 to 50, in particular from 20 to 30, or may even be about 25.

The $NH_4NO_3$ concentration of the solution of step d) may range from 0.01 to 0.5, especially, from 0.05 to 0.4, in particular, from 0.1 to 0.3, or may even be about 0.2 M.

The process for preparing the trimodal modified zeolite Y may also comprise a step of neutralizing the solution before the first filtration. The purpose of the neutralization is to stop the desilication process and to prevent the undesired destruction of the material that can result in extensive loss of crystalline structure of the zeolite, loss of microporosity and induce a decrease in the intrinsic activity of the material.

The neutralization step may be performed by washing with water or with any type of acid, for example, sulfuric acid, in particular, under industrial conditions, on a large amount of material.

Advantageously, the steps of placing in contact (suspending) the zeolite with a basic solution and/or solution of $NH_4NO_3$ can be carried out at room temperature, therefore, do not require heating.

For the purposes of the present invention, the term "room temperature" means a temperature ranging from 18 to 25° C. and in particular, a temperature of 20° C.

In step a), the placing in contact with a basic solution may last from 5 to 120 minutes, especially, from 10 to 60 minutes and in particular, from 15 to 30 minutes.

During this placing in contact, the suspension may be stirred, especially, by magnetic or mechanical stirring.

The drying step may be performed at a temperature greater than or equal to 70° C., especially, greater than or equal to 75° C., or even greater than or equal to 80° C. It may range from one to 36 hours, especially, from 3 to 24 hours and in particular, from 8 to 15 hours.

The drying step may last until the weight of the product no longer changes, in particular, when the difference between the weight of the product at a time t and the weight of this product after two hours of heating changes by less than 0.1% by weight relative to the total weight of the product.

The drying may be performed in air or under an inert atmosphere.

Step d) of placing in contact with the $NH_4NO_3$ solution may last from 2 to 24 hours, especially, from 3 to 12 hours, in particular, from 4 to 8 hours, or even about 5 hours. This step may be performed one to three times.

The calcination step f) may be performed at a temperature of greater than or equal to 400° C., especially, greater than or equal to 450° C., or even greater than or equal to 500° C. The heating may last from 2 to 8 hours, in particular, from 3 to 6 hours, or even from 5 to 7 hours.

The heating may comprise a temperature rise of 0.5 to 2° C./minute and especially 1° C./minute.

The heating may be performed in air or under an inert atmosphere.

The process described above may make it possible to obtain a trimodal modified zeolite Y with a micropore volume that is 30%, especially, 40%, in particular, 45%, or even 50% less than the micropore volume of the starting zeolite Y.

The treated zeolite Y may have a mesopore volume that is 30%, especially 35%, in particular 40%, or even 55% higher than the mesopore volume of the starting zeolite Y. In particular, the increase in mesopore volume is essentially due to the creation of small mesopores.

Optionally, after performing step A) and before performing step B) or C), a step of treatment with water vapour at a temperature from 250 to 450° C. for 2 to 6 hours is performed. This so-called steaming may help to repair/hydrolyse the bonds with aluminium that may have been broken during the alkaline treatment.

Step B)

Usually, the shaping envisaged in step B) is shaping by extrusion.

This extrusion may then be performed by:
(i) mixing the zeolite with at least one binder,
(ii) making a paste by adding to the mixture an aqueous suspension comprising at least one binder, and optionally, at least one agent chosen from the family of flocculants, peptizers or plasticizers,
(iii) extrusion of the paste obtained and chopping so as to obtain extrudates of given shape and length,
(iv) drying the extrudates, and
(v) calcination of the dried extrudates.

Usually, during step (i), the zeolite and the binder are mixed together in the presence of additives, for example polyglycols, such as glycerol, graphite or alternatively, cellulose ethers, for example Tylose®, or mixtures of one or more of these compounds.

When the binder contains alumina, the mixture of zeolite and binder may be prepared in an acidic solution, for example, an acidic aqueous solution, the acid then acting as peptizer.

The acid used may be an inorganic acid, such as nitric acid, or an organic acid.

The binder(s) used during the step B) or step (i) may be chosen from alumina, silica, silica-alumina, magnesia or mixtures of one or more of these compounds.

Alternatively, the binder used during the step B) or step (i) may be titania or its mixture with one of the above mentioned compounds.

The mixture of step B) or i) advantageously comprises from 10% to 90%, for example from 20% to 90%, by weight of binder relatively to the total weight of the mixture.

The drying step (iv) is performed so as to remove substantially all the water present in the extrudates, for example, at a temperature above 60° C., for example, from 80 to 200° C., for 1 to 30 hours depending on the temperature. This drying may be performed, for example, for 16 hours at 110° C. The drying may be accelerated by evacuation or by flowing air or nitrogen.

Usually, the calcination performed during the steps B) or (v) is performed at a temperature from 400 to 700° C., preferably, from 550 to 650° C., for example, at 600° C., for a period of 1 to 20 hours, preferably, from 5 to 15 hours, for example, 10 hours.

Usually, step iv) directly follows step iii) without intermediate cooling.

Step C)

The process for preparing the industrial catalyst according to the invention comprises a step of introducing, for example, by impregnation or ion exchange, at least one catalytic metal chosen from the metals of group VIII and/or of group VIB.

Metal introduction may be performed by impregnating the material with at least one compound of a catalytic metal chosen from group VIII and/or from group VIB.

The impregnation may be performed by incipient wetness impregnation. Typically, the active metal precursor is dissolved in an aqueous or organic solution. The solution thus obtained is then added to the catalytic support, the volume of the solution added being identical or higher than the pore volume of the catalytic support. The catalyst may then be dried and calcined so as to remove the volatile compounds, thus, deposit the metal (e.g. metal oxides) on the surface of the catalyst.

The incipient wetness impregnation may be performed by using various solvents, such as a water-ethylenediamine solution, citric acid or $NH_4OH$, at temperatures from 10 to 100° C. and at pH of 1 to 12.

As an option, the introduction of the catalytic metal(s) may be performed by ion exchange.

Among the catalytic metals, platinum, palladium, nickel, cobalt, tungsten or molybdenum, but also other transition metals, can be used.

Advantageously, the catalyst contains from 0.1% to 10% by weight of a metal from group VIIIB, for example, nickel and/or cobalt, and from 1% to 25% by weight of a metal from group VIB, for example, molybdenum.

Usually, the calcination performed during step C) is performed at a temperature from 400 to 700° C., preferably, from 450 to 650° C., for example, at 500° C. for a period of 1 to 10 hours, preferably, from 1 to 5 hours, for example, 3 hours.

Another aspect of the invention concerns a process for the hydro-conversion of petroleum or of heavy residues, especially, a hydroconversion process, for example, hydrocracking or hydroisomerization, in which the feedstock to be treated is placed in contact with a catalyst according to the invention, for example, prepared according to the process of the invention.

Particularly, another aspect of the invention concerns use of the catalyst obtained according to this invention in a hydroconversion process, in which the hydrocarbon feedstocks are chosen from the group of light cycle oil, atmospheric distillates, vacuum distillates, feeds from aromatic extraction units, from solvent dewaxing of base lubricating oils, distillates derived from processes of desulphurisation, alone or in mixture.

The methods used to perform the measurements of the various characteristics are generally the standard techniques. More particularly, the following techniques were used in the context of this invention:

i) the chemical composition, in particular the Si/Al atomic ratio and the sodium content, were determined by X-ray fluorescence spectroscopy, ii) the structure of the zeolite was defined by X-ray diffraction (XRD). XRD was conducted on a Bruker Avance D8 diffractometer either in the range between 3 to 50° with a Cu $K_{\alpha 1}$ radiation (for Cat-HY30 and Cat-HYA) or in the range between 5 to 50° with a Co $K_{\alpha 12}$ radiation (for HY30, HYA and HYB). The crystallinity of the samples was determined by normalization of the intensities of the reflection to the intensities of the characteristic reflections of the ZSM-5 crystal, iii) the nitrogen adsorption and desorption measurements were performed at the temperature of liquid nitrogen on a Micromeritics Tristar 3000 machine. Before each measurement, the samples were degassed under nitrogen at 300° C. for 840 minutes. The textural properties, defined by the external surface area ($S_{ext}$), the micropore volume ($V_{micro}$) and the mesopore volume ($V_{meso}$), were identified by volumetry with nitrogen using adsorption isotherms recorded at 77 K by applying the state-of-the-art methods [Barett, E. P.; Joyner, L. G.; Halenda, P. P. *J. Am. Chem. Soc.* 1951, 73, 373-380. Rouquerol, F.; Rouquerol, J.; Sing, K. *Adsorption by powders and porous solids*; Academic Press: San Diego, 1999]. The BET method [S. Brunauer, P. H. Emmett and E. Teller, *J. Am. Chem. Soc.*, 1938, 60, 309] was used to calculate the specific surface area. The external specific surface area and the specific pore volume were determined by the t-plot method, an empirical semi-quantitative method based on the comparison of the isotherm adsorption data of a porous sample and a non-porous sample of identical chemical composition and surface nature [K. S. W. Sing, Chem. and Ind., (1968) 1520]; the statistical thickness was calculated by means of the Harkins-Jura formula. The t-plot method is based on the comparison of the isotherm adsorption data for a porous sample and for a non-porous sample of identical chemical composition and surface nature.

iv) the microstructure of the zeolites was observed by transmission electron microscopy (TEM) using a Jeol 1200 EX II microscope operating at a voltage of 100 kV (magnifications of 20 000-120 000), (v) the electron tomography studies were performed on an electron transmission microscope Tecnai 20 at a voltage of 200 kV. The series of images were acquired under brilliant field image conditions for an angular tilt range from −75 to 75° and with an inclination increment of 1° for a magnification of 19 000 or 29 000. Three-dimensional reconstructions were calculated from the inclination series acquired, using IMOD software, vi) the acidity of the catalysts was established by programmed thermo-desorption of ammonia (TPD $NH_3$) between 100 and 650° C. [Niwa, M.; Iwamoto, M.; Segawa, K. B. *Chem. Soc. Jpn.* 1986, 59] by monitoring the desorbed ammonia by conductivity.

The invention is now described with reference to the attached non-limiting drawings, in which.

EXAMPLES

Figure 1:
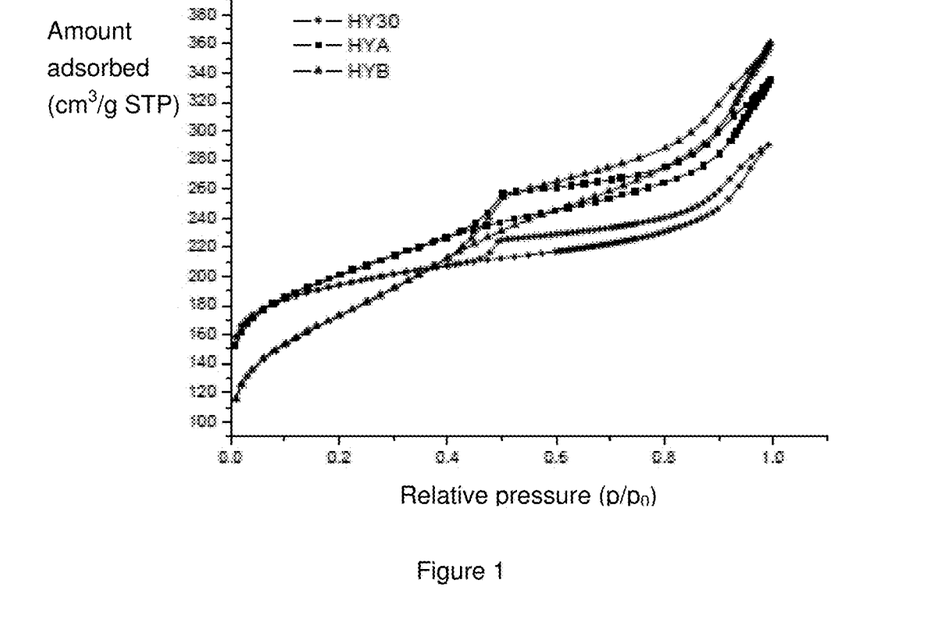
FIG. 1 shows the nitrogen sorption isotherms for a commercial zeolite Y (HY30) and for two zeolites with trimodal porosity (HYA and HYB), the volume of adsorbed nitrogen ($cm^3/g$) being represented as a function of the partial pressure of nitrogen ($P/P_0$)

The zeolite Y (CBV760, Zeolyst Int.) is referred to as HY30. The nitrogen sorption isotherm of HY30 is represented in FIG. 1, and the characteristics of HY30 are given in Table 1.

This zeolite Y underwent dealumination before treatment to obtain a modified zeolite Y. It has an Si/Al ratio of 28.4, and an acidity measured by TPD $NH_3$, of 0.32 mmol/g.

Example 1

Preparation of a Modified Zeolite Y with Trimodal Porosity (HYA)

The compound HY30 is subjected to the following alkaline treatment:
 HY30 (2 g) is placed in contact with an aqueous 0.05 M NaOH solution (50 ml) for 15 minutes at room temperature and with stirring,
 the resulting product is filtered off and washed with water until a neutral pH (pH=7) is obtained,
 the filtered product is dried for 12 hours at 80° C.,
 aqueous 0.20 M $NH_4NO_3$ solution (50 ml) is added to the dry product, and the whole is left for 5 hours at room temperature under stirring,
 the product obtained is washed with distilled water (3×50 ml),
 the product is then calcined at 500° C. for 4 hours (temperature gradient of 1° C./minute) with a stream of air, and then
 the HYA produced is recovered.

The HYA produced has an Si/Al ratio of 24.8, and an acidity measured by TPD $NH_3$ of 0.20 mmol/g.

Example 2

Preparation of a Modified Zeolite Y with Trimodal Porosity (HYB)

The compound HY30 is subjected to the following alkaline treatment:
 HY30 (2 g) is placed in contact with an aqueous 0.10 M NaOH solution (50 ml) for 15 minutes at room temperature under stirring,
 the resulting product is filtered off and washed with water until a neutral pH (pH=7) is obtained,
 the filtered product is dried for 12 hours at 80° C.,
 an aqueous 0.20 M $NH_4NO_3$ solution (50 ml) is added to the dry product, and the whole is left for 5 hours at room temperature under stirring,
 the product obtained is washed with distilled water (3×50 ml),
 the product is then calcined at 500° C. for 4 hours (temperature gradient of 1° C./minute) with a stream of air, and then
 the HYB produced is recovered.

The HYB produced has an Si/Al ratio of 20.5, and an acidity measured by TPD $NH_3$ of 0.21 mmol/g.

Example 3

Characterization of the Compounds HY30, HYA and HYB

Nitrogen Sorption

The nitrogen sorption isotherms of HY30, HYA and HYB are represented in FIG. 1.

The presence of a hysteresis loop in each of the isotherms demonstrates the presence of mesopores in each of the samples.

The comparison of the isotherms presented in FIG. 1 and, in particular, the increase in the amount adsorbed at highest relative pressures shows that the alkaline treatment brings about an increase in the total porosity of HYA and HYB compared to HY30.

In addition, the higher the concentration of NaOH, the higher the porosity.

At the lowest relative pressures, the nitrogen adsorption that corresponds to the microporosity does not appear to vary for HY30 and HYA. The harsher alkaline treatment (HYB) leads to a decrease in the micropore volume and to an even larger mesoporosity.

The development of mesoporosity is confirmed by a BJH (Barret-Joyner-Halenda) analysis of the pore size distribution. The pore size distributions, derived from the adsorption part of the isotherm, are represented in FIG. 2.

Figure 2:
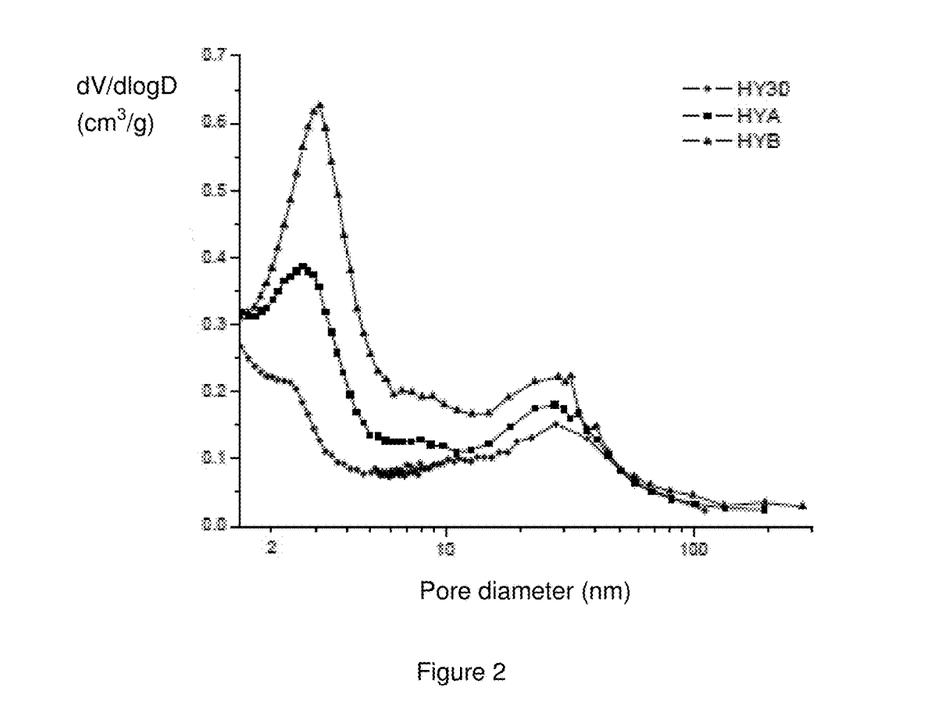
FIG. 2 represents the dV/d log D BJH adsorption curves as a function of the pore diameter (nm) measured for a commercial zeolite Y (HY30) and for two zeolites with trimodal porosity (HYA and HYB)

As shown in FIG. 2, the BJH adsorption clearly shows two distinct regions of pores:
 a region of "small mesopores" centred at 3 nm
 a region of "large mesopores" centred at 30 nm.

From the sample HY30 (no alkaline treatment) to HYA (mild alkaline treatment) and then to HYB (harsh alkaline treatment), the intensity of the peak corresponding to the small mesopores increases significantly, whereas the intensity of the peak corresponding to the large mesopores shows only a small increase coupled with weak broadening.

This shape of the BJH adsorption curves shows that the alkaline treatment of HY30 essentially induces the formation of small mesopores, whereas an increase in the volume of the large mesopores is less pronounced. Furthermore, the dimensions of the two types of mesopores do not appear to be dependent on the conditions of the alkaline treatment.

Table 1 shows the characteristics of HY30, HYA and HYB. Notably, the corresponding volumes of the small and large mesopores are derived from the integration of the BJH adsorption part for a chosen range of diameters.

TABLE 1

Nitrogen sorption results for HY30, HYA and HYB

| Sample | | HY30 | HYA | HYB |
|---|---|---|---|---|
| $S_{ex+meso}{}^a$ | m²/g | 213 | 339 | 443 |
| $V_{micro}{}^b$ | ml/g | 0.21 | 0.16 | 0.07 |
| $V_{meso}{}^c$ | ml/g | 0.16 | 0.25 | 0.37 |
| $V_{small\ meso}{}^d$ | ml/g | 0.07 | 0.14 | 0.23 |
| $V_{large\ meso}{}^e$ | ml/g | 0.09 | 0.11 | 0.14 |
| $V_{macro}{}^f$ | ml/g | 0.02 | 0.02 | 0.03 |
| $V_{tot}{}^g$ | ml/g | 0.45 | 0.51 | 0.55 |
| Pore diameter$^h$ (nm) | "small" | — | 2.7 | 3.1 |
| | "large" | 28 | 27 | 27 |

$^a$mesopore surface area and external surface area calculated from the t-plot;
$^b$micropore volume obtained by t-plot;
$^c$mesopore volume obtained by integration of the dV/dD BJH adsorption curve for the pores 2 to 50 nm in diameter;
$^d$volume of the small mesopores obtained by integration of the BJH dV/dD adsorption curve for the pores 2 to 8 nm in diameter;
$^e$volume of the large mesopores obtained by integration of the BJH dV/dD adsorption curve for the pores 8 to 50 nm in diameter;
$^f$macropore volume obtained by integration of the BJH dV/dD adsorption curve for the pores greater than 50 nm in diameter;
$^g$volume adsorbed at p/p$_0$ = 0.99;
$^h$pore size distribution obtained from the BJH dV/dlogD adsorption curve.

X-Ray Diffraction

The analysis by X-ray diffraction confirms the preservation of crystallinity of HYA that has undergone a mild alkaline treatment relative to the starting zeolite HY30.

The sample HYB that has undergone a harsher alkaline treatment shows partial destruction of the long-range crystal ordering, but the overall crystallinity of the sample is preserved, as the characteristic zeolite Y reflections are still present. The preserved zeolitic nature and morphology of the zeolite Y is also confirmed by nitrogen sorption and electron microscopy.

Transmission Electron Microscopy (TEM)

The TEM micrographs show that the large crystals of zeolite Y remain intact, even after a harsh alkaline treatment. Inside all the particles, the presence of mesopores in the form of channels and spheres is observed, the channels penetrate into the particle, connecting the outer surface to the interior of the particle. Furthermore, the samples that have undergone an alkaline treatment appear to have a structure similar to a sponge, in contrast to the starting zeolite HY30. Based on the TEM micrographs one cannot distinguish the interconnection of the pores, their shape and dimensions.

Electron Tomography (3D-TEM)

In contrast to conventional TEM microscopy, electron tomography allows better observation of the internal structure of the complex network of pores of the studied samples. In order to confirm the presence of the trimodal porosity demonstrated by the nitrogen sorption, the samples were subjected to an analysis by 3D-TEM, and the 3-dimensional (3D) reconstructions of the chosen particles were obtained.

Figure 3:
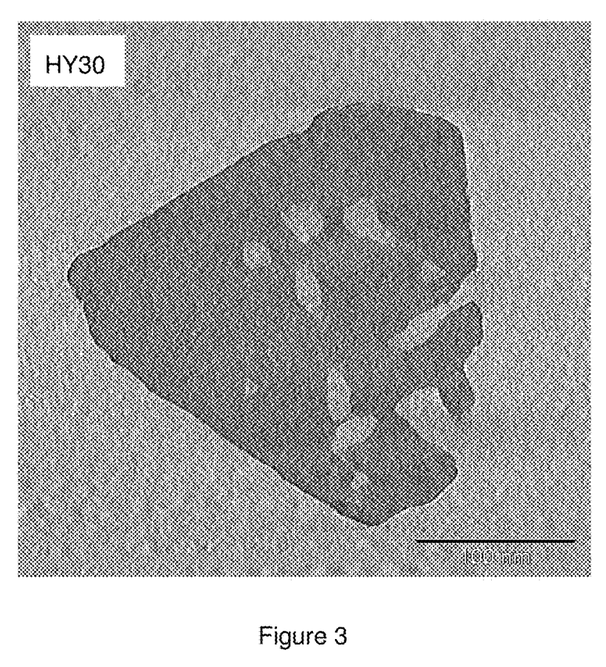
FIGS. 3, 3A and 3B represent, respectively, a TEM-3D image of a commercial zeolite Y (HY30) and those of two zeolites with trimodal porosity (HYA and HYB)
Figure 3A:
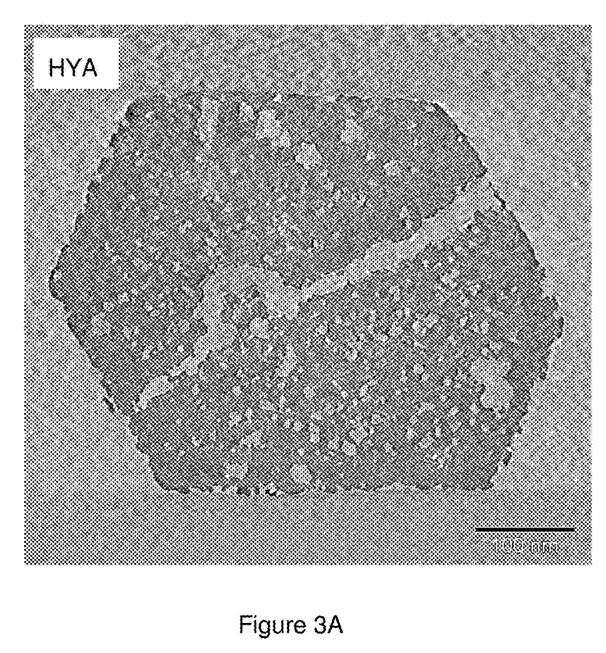
Figure 3B:
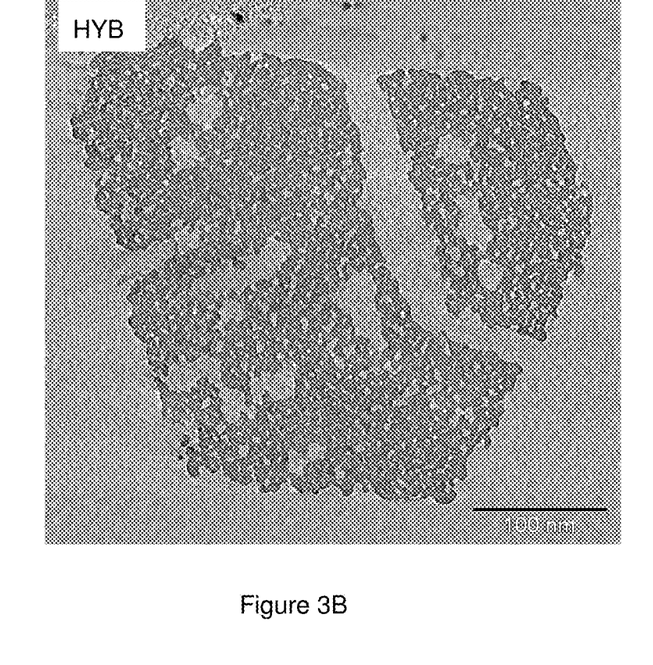

FIGS. 3, 3A and 3B represent a section by 3D reconstruction of each of the three samples. Since the slices observed have a thickness of between 0.5 and 0.8 nm, they are not affected by the overlap characteristics as it is the case for conventional TEM micrographs.

The lightest regions correspond to the pores, and the dark regions represent the solid matter.

FIG. 3 represents a cross section of the sample HY30, 0.82 nm thick. The vapour and acid treatment led to creation of large mesopores in the form of channels and spheres of a broad diameter range, as shown by nitrogen sorption. The channel-shaped mesopores intersect and penetrate the particle from the outside inwards. The presence of isolated cavities is also confirmed. Although the nitrogen sorption shows that small mesopores are present, and their volume is virtually identical to that of the large mesopores, those appear to be absent.

FIG. 3A represents a cross section of 0.82 nm thickness of the sample HYA that has undergone a mild alkaline treatment. A new series of small mesopores has appeared, and the walls of the mesopores in the form of channels and cavities are more irregular. The formation of small mesopores and their diameter (2-5 nm) can be measured with great precision and is in accordance with the results obtained by nitrogen sorption. Furthermore, the small mesopores appear to be uniformly distributed over the entire volume of the particle and are interconnected.

FIG. 3B represents a cross section of 0.54 nm thickness of the sample HYB that has undergone a harsh alkaline treatment. An increase in the number of small mesopores is observed, confirming the results of the nitrogen sorption. Pores with a diameter as small as 1.2 nm can be observed, and the general density of these small mesopores appears to be greater than for HYA. As for the sample HYA, the 3D reconstruction of the entire particle represents interconnections of these small mesopores.

Conclusion

The various characterization techniques demonstrate the particular mesoporous structure of the modified zeolites Y.

The vapour treatment followed by an acid treatment (HY30) leads essentially to the generation of mesopores of about 30 nm, having a shape of channels and cavities.

An additional alkaline treatment leads to the formation of a new network of small mesopores. The zeolites modified by the alkaline treatment and described in WO 2010/072 976 have a trimodal pore system, containing micropores, small mesopores and large mesopores.

Without wishing to be bound by this theory, it appears from the 3D-TEM analysis that these various networks of micropores and mesopores, and in particular, the new pores formed (network of small mesopores), are inter-connected (the mesopore networks being interconnected with each other and via the micropores), which would make it possible to reduce the molecular diffusion limitations usually encountered, leading to an increased catalytic activity of the zeolites with trimodal porosity, as shown in the following examples.

Example 4

Shaping of the Industrial Catalyst Based on Modified Zeolite Y

The commercially available modified zeolite Y, HY30 (CBV760, Zeolyst), and the zeolites with trimodal porosity HYA and HYB, were shaped by extrusion, followed by a calcination step.

The zeolite powder (HY30, HYA or HYB) was mixed with a binder, alumina (Condea SB, 75% Al$_2$O$_3$), in an HY30/binder ratio of 80/20% by weight.

Before extrusion and mixing with a binder, the zeolite powders HYA and HYB underwent a mild water vapour treatment ("steaming") for 4 hours at 300° C.-500° C. once the final temperature was reached at a heating rate of 1-3° C./min starting from room temperature so as to repair/hydrolyse the aluminium bonds that may have been broken during the alkaline treatment.

The extrusion process used is described below in detail:
- weighing 250 g of alumina Condea, corresponding to 187.5 g of Al$_2$O$_3$
- weighing 115 g of nitric acid (2.1% HNO$_3$ solution)
- addition of nitric acid to the alumina, followed by stirring of the mixture (apparatus used: Aoustin MX2)
- weighing 750 g of HY30, HYA or HYB (powders) and addition to the mixture under stirring
- adding 10 g of a flocculant (Optimer® 9779, Nalco) and 30 g of Tylose® (Hoechst)
- adding distilled water (400 to 450 ml) until a paste of the desired consistency is obtained
- mixing of the paste is continued for 60 minutes
- extrusion of the paste using an Aoustin MXE extruder
- drying at 110° C. for 16 hours (temperature rise of 1° C./minute)
- calcination at 600° C. for 10 hours (1° C./minute).

The extrudates obtained had a cylindrical shape and were about 7 mm long and 1.5 mm in diameter.

The extrudates then underwent a step of impregnation with metallic compounds, followed by calcination, as specified hereinbelow. The impregnation was performed via incipient wetness impregnation, a method described above.

The operating method used in the tests is as follows: 200 g of extrudates were impregnated with 200 ml of aqueous solution containing 34.5 g of Ni(NO$_3$)$_2$.6H$_2$O, 54.3 g of (NH$_4$)$_6$Mo$_7$O$_{24}$.4H$_2$O and ethylenediamine in a molar fourfold to Ni. These amounts correspond to a target content of 3.5% by weight of NiO and 17.5% by weight of MoO$_3$.

The extrudates were then dried at 110° C. for 16 hours and calcined at 500° C. (3° C./minute) for 3 hours under a stream of air (50 Nl/hour), with observation of a colour change from purple to grey.

These extrudates are now ready to be used industrially. The extrudates thus obtained based on HY30, HYA and HYB are referred to hereinbelow as Cat-HY30, Cat-HYA and Cat-HYB, respectively.

Example 5

Characterization of the Industrial Shaped Catalysts

X-Ray Diffraction (Bruker D5000)

Figure 4:
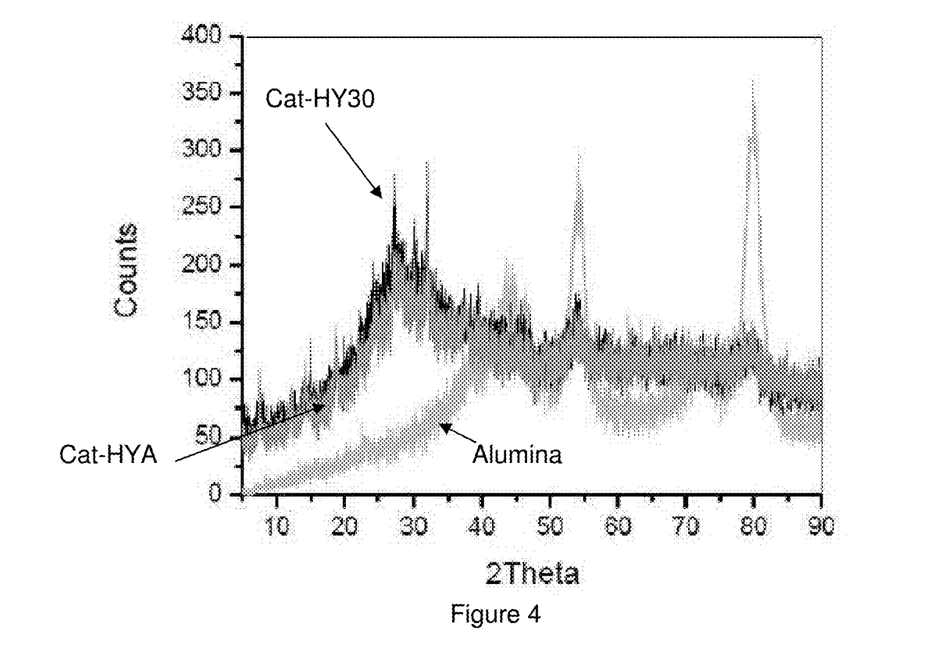
FIG. 4 represents the X-ray diffractograms of Cat-HY30 (black diffractogram), Cat-HYA (dark grey diffractogram almost superposed to the black one) and alumina (light grey diffractogram)

The diffractograms of the catalysts Cat-HY30 (black), Cat-HYA (dark grey) and alumina (light grey) were recorded (FIG. 4). The diffractograms of Cat-HY30 and Cat-HYA are virtually identical. Reflections are observed at 2θ values of 6; 11.8; 15.6; 20.2; 26.5; 30.1; 30.8°, which correspond to the characteristic reflections of faujasite [Collection of simulated XRD powder patterns for zeolites, fifth revised edition, by M. M. J. Treacy and J. B. Higgins, Elsevier]. Reflections are also observed at 2θ values of 47; 53; 80°, corresponding to the reflections of alumina.

The diffractograms of Cat-HY30 and Cat-HYA show a broad reflection centred at 2θ=26.5°. The two reflections at 2θ=53° and 2θ=80°, being intense in the diffractogramm of alumina, are very weak for the two catalysts Cat-HY30 and Cat-HYA.

The two catalysts have a degree of crystallinity of about 3% to 10%.

Nitrogen Sorption

The adsorption and desorption measurements were carried out at the temperature of liquid nitrogen on a Micromeritics Tristar 3000 apparatus.

Figure 5:
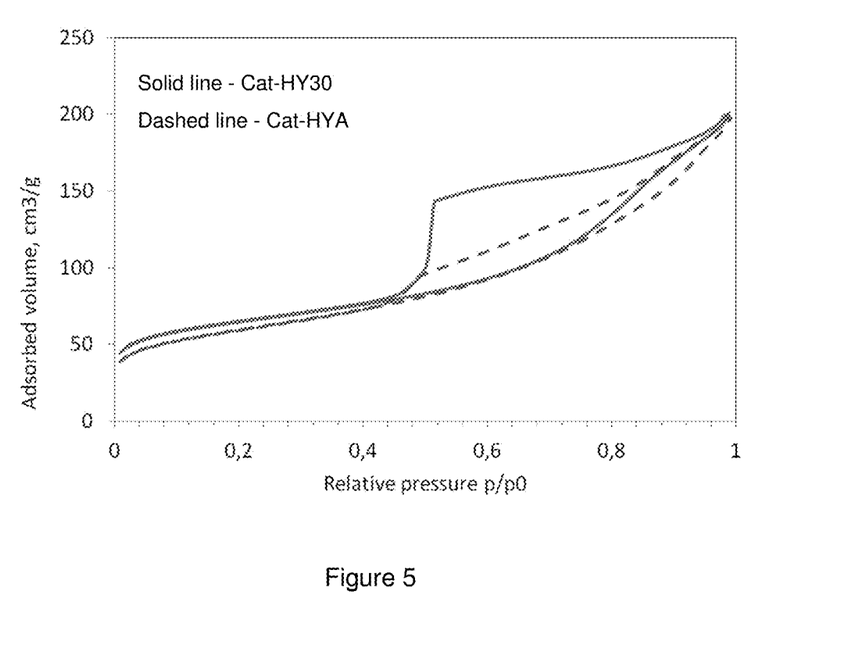
FIG. 5 represents the nitrogen sorption isotherms for the catalysts Cat-HY30 (solid line) and Cat-HYA (dashed line)

FIG. 5 shows the nitrogen sorption isotherms for Cat-HY30 (solid line) and Cat-HYA (dashed line). These isotherms are of IV type, typical of mesoporous materials [F. Rouquerol, J. Rouquerol, K. Sing, Adsorption by Powders and Porous Solids: Principles, Methodology and Applications, Academic Press, London, 1999]. The isotherm of Cat-HY30 showed a clear decrease of the desorption profile at 0.5 p/p$_0$, indicating the presence of large mesopores. The shape of the hysteresis of Cat-HYA suggested the presence of aggregates of particles in the form of platelets with pores of different shapes and sizes.

Figure 6:
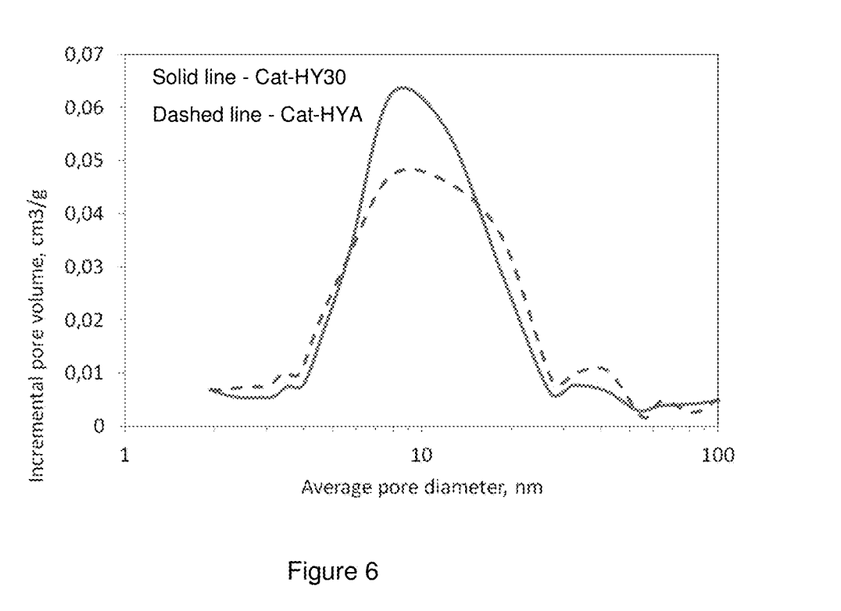
FIG. 6 represents the pore size distribution for the catalysts Cat-HY30 (solid line) and Cat-HYA (dashed line)

FIG. 6 shows the pore size distribution of Cat-HY30 (solid line) and Cat-HYA (dashed line), calculated according to the BJH method applied to the adsorption curve of the isotherm. The BJH model was developed by Barrett, Joyner and Halenda [E. P. Barrett, L. G. Joyner, P. P. Halenda, J. Amer. Chem. Soc. 61 (1951) 373]. The pore size distribution graph of Cat-HY30 showed a more pronounced peak between 6 and 19 nm, while the pore volume was higher for Cat-HYA in the ranges of pore diameters of 2-6 and 20-50 nm.

Table 2 shows the nitrogen sorption results for Cat-HY30 and Cat-HYA. The BET specific surface areas are similar for the two samples, while the specific surface area of Cat-HYA is 30 m$^2$/g higher than that for Cat-HY30. The micropore volume is twice as high for Cat-HY30 compared to Cat-HYA. The mesopore and total volumes are very similar for the two samples, however, the volume of the small mesopores (2-6 nm) and of the large mesopores (20-50 nm) is higher for Cat-HYA than for Cat-HY30, 0.01 and 0.02 ml/g, respectively.

TABLE 2

Results of the nitrogen sorption for the catalysts Cat-HY30 and Cat-HYA

| | $S_{BET}$ (m$^2$/g) | $S_{ext}^a$ (m$^2$/g) | $V_{micro}^b$ (cm$^3$/g) | $V_{meso}^c$ (cm$^3$/g) | $V_{small\ meso}^d$ (cm$^3$/g) | $V_{large\ meso}^e$ (cm$^3$/g) | $V_{tot}^f$ (cm$^3$/g) |
|---|---|---|---|---|---|---|---|
| Cat-HY30 | 232 | 135 | 0.04 | 0.26 | 0.09 | 0.05 | 0.31 |
| Cat-HYA | 228 | 166 | 0.02 | 0.26 | 0.10 | 0.07 | 0.31 |

$^a$external specific surface area calculated from t-plot;
$^b$micropore volume obtained from t-plot;
$^c$mesopore volume obtained by integration of the dV/dD BJH adsorption curve for the pores 2 to 50 nm in diameter;
$^d$volume of the small mesopores obtained by integration of the BJH dV/dD adsorption curve for the pores 2 to 6 nm in diameter;
$^e$volume of the large mesopores obtained by integration of the BJH dV/dD adsorption curve for the pores 20 to 50 nm in diameter.

Temperature-Programmed Desorption of NH$_3$ (TPD NH$_3$)

The amount of Brønsted acid sites (BAS) was determined by temperature-programmed desorption of NH$_3$. The amount of BAS was 1.3 mmol/g for Cat-HY30 and 1.2 mmol/g for Cat-HYA.

Transmission Electron Microscopy (TEM)

The transmission electron micrographs were recorded using a Tecnai 20 transmission electron microscope at 200 kV. The images were acquired with a magnification of 19

Figure 7:
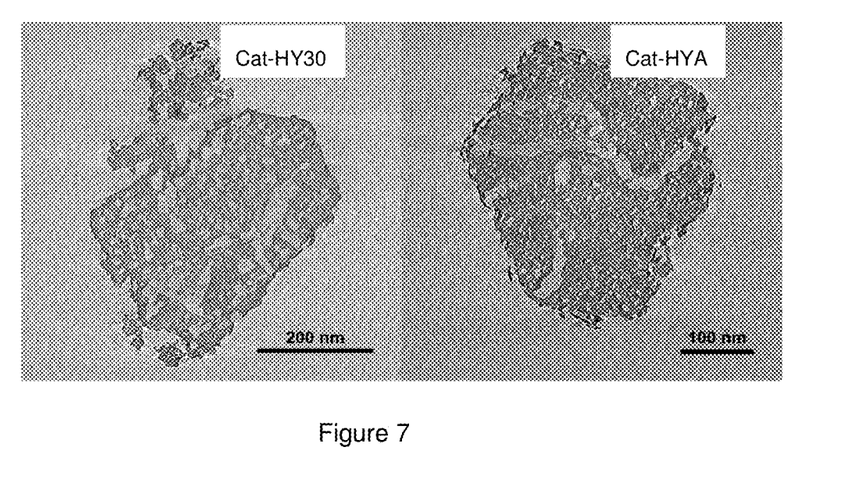
FIG. 7 represents the electron transmission micrographs of the catalysts Cat-HY30 and Cat-HYA.

000. The resolution of the reconstructions is sufficient to visualize micropores down to 2 nm in diameter. FIG. 7 shows the transmission electron micrographs of a crystal of Cat-HY30 and Cat-HYA. The two crystals show high porosity, but Cat-HYA appears to have more small mesopores. A dark line surrounding the crystals probably corresponds to the binder.

Example 6

Catalysis—Hydrocracking of Pretreated Vacuum Gas Oil (VGO)

The catalysts Cat-HY30 and Cat-HYA were tested in hydrocracking of pretreated VGO, the composition of which is given in Table 3. The operating conditions for the pretreatment of VGO were as follows:
Pressure: 131 bar
Temperature: 395-397° C.
LHSV: 1.2 h$^{-1}$
H$_2$/HC ratio: 750.

During the pretreatment, the lights (compounds boiling below 35° C., including H$_2$S and NH$_3$) were removed.

TABLE 3

VGO composition

|  | VGO | Pretreated VGO[1] |
|---|---|---|
| Density at 15° C., g/mL | 0.9189 | 0.8579 |
| Density at 60° C., g/mL | 0.887 | 0.8259 |
| Total nitrogen, ppm | 1418 | 13.4 |
| Basic nitrogen, ppm | 401 | 0 |
| Conradson carbon, weight % | 0.34 | 0 |
| Asphalthenes, weight % | <0.5 | 0 |
| Kinematic viscosity 70° C., mm$^2$/s | 20.64 | 4.791 |
| Kinematic viscosity 100° C., mm$^2$/s | 8.524 | 2.729 |
| Sulfur content, ppm | 10 909 | 18.5 |
| Aromatics, weight % | 38.4 | 18.9 |
| Mono[2] | 18.1 | 16.9 |
| Di[2] | 5.2 | 1 |
| Tri[2] | 15.1 | 1 |
| Hydrogen content, weight % | 12.35 | 13.62 |
| 375-[3], weight % | 15.9 | 42.1 |

[1]for the conditions of the pretreatment, please see the text above.
[2]correspond to compounds comprising one (mono), two (di) or three (tri) benzene rings.
[3]compounds boiling below 375° C.

The operating conditions of the hydrocracker were as follows:
Pressure: 155 bar
Temperature: 365-395° C.
LHSV: 2.43 h$^{-1}$
H$_2$/HC ratio: 800.

Table 4 gives the results for hydrocracking of pretreated VGO over Cat-HYA in comparison to Cat-HY30.

The net 375+ conversion, the net yield of middle distillates (MD) and the hydrogen consumption (based on the H content determined by MINISPEC, a quantitative $^1$H NMR method) are reported.

At 380° C., 7% higher conversion is obtained over Cat-HY30 than over Cat-HYA. The yield of middle distillates (hydrocarbon fraction with a boiling point between 145 and 375° C.), at 80% conversion, is 9% by weight higher for Cat-HYA than for Cat-HY30.

The use of Cat-HYA makes it possible to suppress the formation of light hydrocarbons boiling below 145° C.

The hydrogen consumption is reduced from 1.55% to 0.72%, corresponding to a hydrogen saving of 54%.

TABLE 4

Results of hydrocracking of pretreated VGO

| Catalyst | Conversion, weight % 380° C. | Yield of middle distillates, weight % At 80% conversion | H$_2$ consumption, % At 80% conversion |
|---|---|---|---|
| Cat-HY30 | 66 | ref | 1.55 |
| Cat-HYA | 59 | ref + 9 | 0.72 |

The invention claimed is:

1. A process for preparing a hydroconversion catalyst based on modified zeolite Y, comprising in the following order the steps of:
    (A) preparing a modified zeolite Y of faujasite structure having an intracrystalline structure comprising at least one network of micropores, at least one network of small mesopores with a mean diameter of 2 to 5 nm and at least one network of large mesopores with a mean diameter of 10 to 50 nm, wherein the networks are interconnected;
    (B) mixing the modified zeolite Y with at least one first binder, shaping the resulting mixture by extrusion and then calcining, to obtain a shaped mixture; and
    (C) introducing at least one catalytic metal chosen from metals of group VIIIB or group VIB into the shaped mixture, followed by calcination,
    wherein the step (B) including the shaping by extrusion comprises:
        (i) making a paste by adding to a mixture of zeolite and at least one binder an aqueous suspension comprising at least one binder, and, optionally, at least one agent chosen from the families of flocculants, peptizers or plasticizers,
        (ii) extrusion of the paste obtained and chopping so as to obtain the extrudates of given shape and length,
        (iii) drying the extruded particles,
        (iv) calcination of the dried extruded particles.

2. The process according to claim 1, wherein the calcination of step (B) is performed at a temperature of 400 to 700° C.

3. The process according to claim 1, wherein the at least one first binder of step (B) is chosen from silica, alumina, silica-alumina, magnesia, or a mixture thereof.

4. The process according to claim 1, wherein the mixture obtained in step (B) comprises from 10% to 90% by weight of the first binder relative to the total weight of the mixture.

5. The process according to claim 1, wherein the modified zeolite Y treated in step (A) has a ratio of the volume of small mesopores (Vs) to the volume of large mesopores (Vl), Vs/Vl, of higher than or equal to 1.

6. The process according to claim 1, wherein the modified zeolite Y treated in step (A) has a total mesopore volume of higher than or equal to 0.20 ml/g.

7. The process according to claim 1, wherein the modified zeolite Y treated in step (A) has a micropore volume of less than or equal to 0.20 ml/g.

8. The process according to claim 1, wherein the modified zeolite Y treated in step (A) has a total mesopore volume/micropore volume ratio of higher than or equal to 1.

9. The process according to claim 1, wherein step (A) comprises the following steps:
    a) contacting a zeolite Y with a basic aqueous solution comprising at least one base at a concentration ranging from 0.001 to 0.5 M at room temperature and under magnetic or mechanical stirring, b) filtering off the zeolite obtained in step (a) and washing with a solvent, c) optionally, drying the washed zeolite, d) contacting the washed and optionally dried zeolite with a solution of $NH_4NO_3$, e) washing the zeolite obtained in step (d) with distilled water to neutral pH, f) calcining the zeolite obtained in step (e), and g) recovering the zeolite obtained in step (f) as the modified zeolite Y.

10. The process according to claim 9, wherein the zeolite Y treated in step (a) has an Si/Al ratio of higher than or equal to 12.

11. The process according to claim 9, wherein the zeolite Y treated in step (a) has undergone at least one dealumination treatment by at least one acid or by steam.

12. The process according to claim 9, wherein the at least one base is selected from NaOH, $NH_4OH$, KOH, sodium carbonate or sodium citrate.

13. The process according to claim 9, wherein the solvent is a polar solvent.

14. The process according to claim 13, wherein the polar solvent is pure distilled water.

15. The process according to claim 9, wherein the solution is an aqueous solution of $NH_4NO_3$ at a concentration ranging from 0.01 to 0.5 M.

16. The process according to claim 1, wherein after performing step (A) and before performing step (B), a step of steam treatment at a temperature of 250 to 450° C. is performed for a duration of 2 to 6 hours.

17. A process for preparing a hydroconversion catalyst based on modified zeolite Y, comprising in the following order the steps of:

(A) preparing a modified zeolite Y of faujasite structure having an intracrystalline structure comprising at least one network of micropores, at least one network of small mesopores with a mean diameter of 2 to 5 nm and at least one network of large mesopores with a mean diameter of 10 to 50 nm, wherein the networks are interconnected;

(C) introducing at least one catalytic metal chosen from metals of group VIIIB or group VIB into the modified zeolite Y, followed by calcination; and (B) mixing the modified zeolite Y obtained in step (C) with at least one first binder, shaping the resulting mixture by extrusion and then calcining, wherein the step (B) including the shaping by extrusion comprises:

(i) making a paste by adding to a mixture of zeolite and at least one binder an aqueous suspension comprising at least one binder, and, optionally, at least one agent chosen from the families of flocculants, peptizers or plasticizers, (ii) extrusion of the paste obtained and chopping so as to obtain the extrudates of given shape and length, (iii) drying the extruded particles, (iv) calcination of the dried extruded particles.

18. A hydroconversion catalyst obtained via the process according to claim 1, characterized in that the hydroconversion catalyst consists of a shaped mixture comprising:

a modified zeolite Y, having an intra-crystalline structure comprising at least one network of micropores, at least one network of small mesopores with a mean diameter of 2 to 5 nm and at least one network of large mesopores with a mean diameter of 10 to 50 nm, wherein the networks are interconnected;

at least one binder; and at least one catalytic metal chosen from metals of group VIIIB and/or of group VIB, said catalyst having the following characteristics:

crystallinity of 3% to 80%, specific surface area (BET) from 150 to 550 $m^2/g$, external specific surface area: 50-250 $m^2/g$, total pore volume: from 0.2 to 0.6 ml/g, and zeolite content: 10% to 90% by weight.

19. The hydroconversion catalyst according to claim 18, having a crystallinity of 3% to 20%.

20. A process for hydroconversion of petroleum or heavy residues comprising a step of bringing feed into contact with the catalyst according to claim 18.

* * * * *